March 1, 1938. J. T. MARTIN 2,109,907
HAY HANDLING APPARATUS
Filed April 27, 1936 2 Sheets-Sheet 2
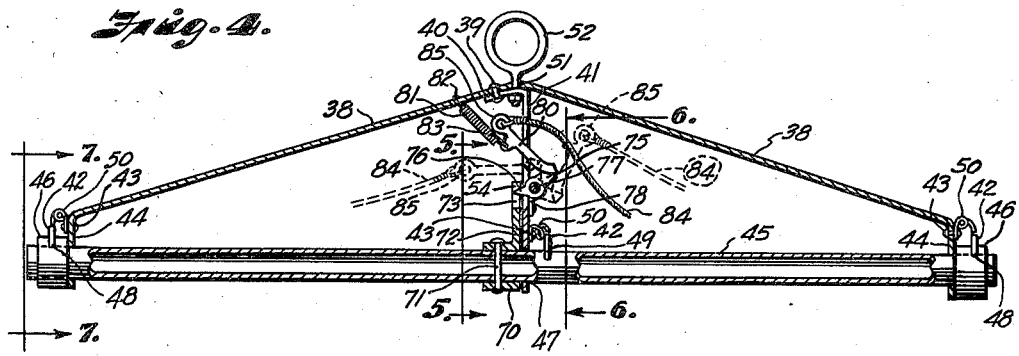
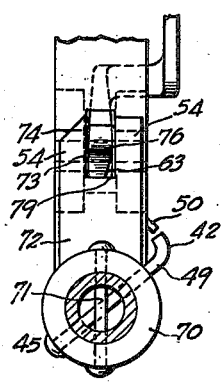
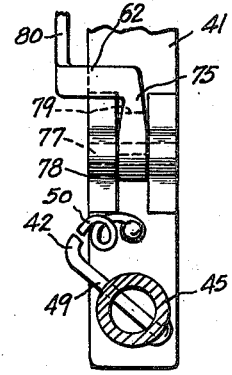
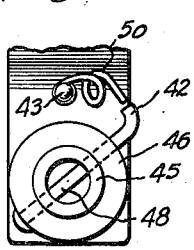
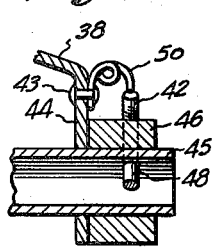
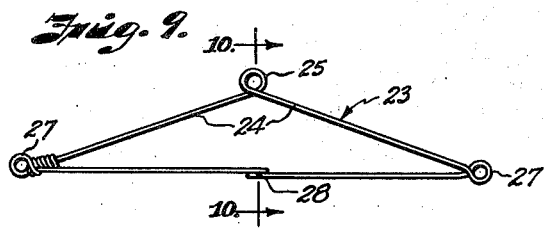
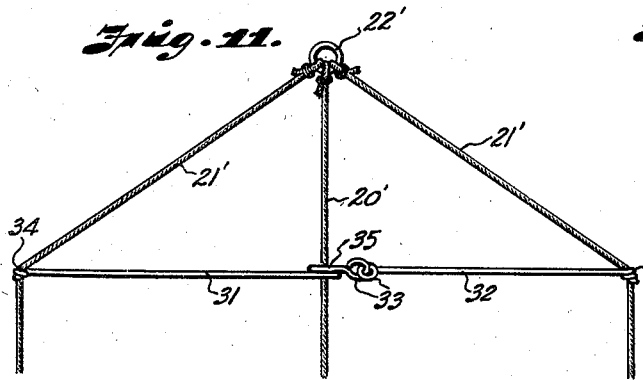
INVENTOR.
John T. Martin
BY Alfred R. Fuchs
ATTORNEY Patented Mar. 1, 1938

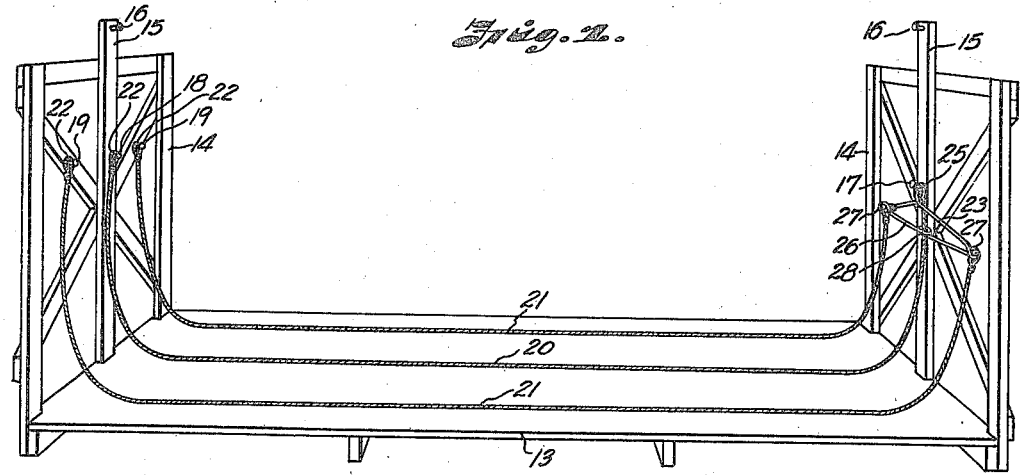
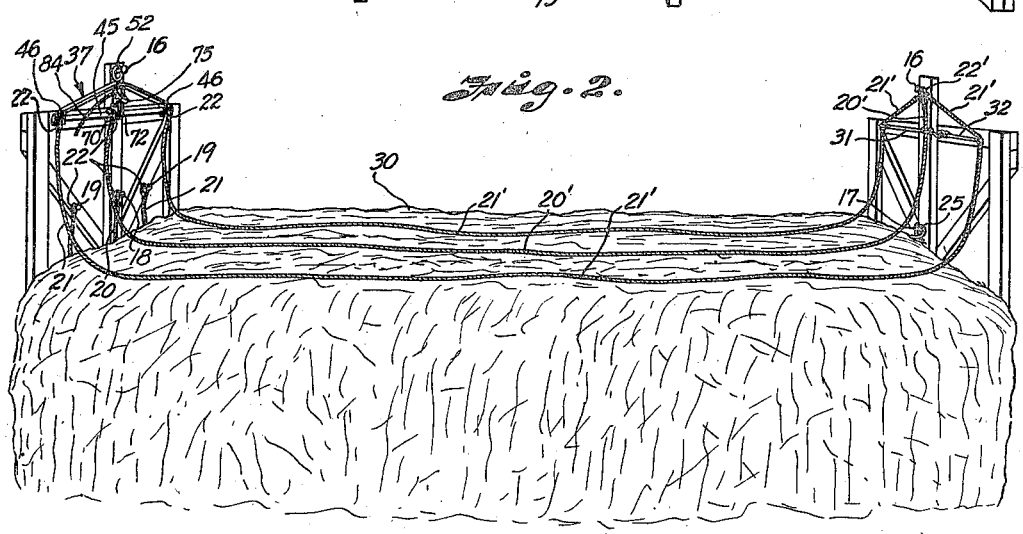
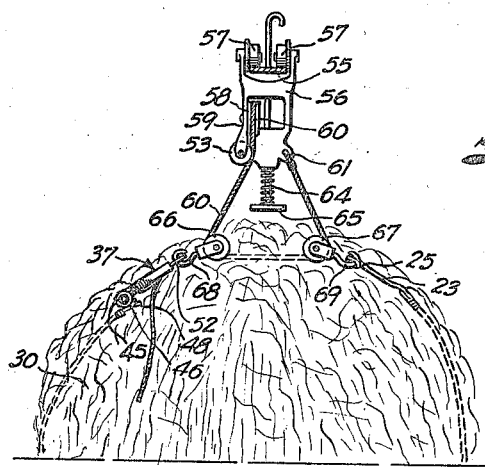

2,109,907

UNITED STATES PATENT OFFICE 2,109,907

HAY HANDLING APPARATUS

John T. Martin, near Hanover, Kans.

Application April 27, 1936, Serial No. 76,575

21 Claims. (Cl. 294—74)

My invention relates to hay handling apparatus, and more particularly to apparatus for efficiently lifting the hay from a hay rack to carry the same to a storage place, such as a barn.

In storing hay it has been customary to use several different types of slings, one of which is known sometimes as a "hay net" and which is a slatted structure, which may be connected by means of ropes, or other flexible members, to form a slatted netting. The objection to the slings of this type is that they are quite expensive as compared with what are known as rope slings, and require much more time and labor in handling the same and spreading out the same over the hay rack before loading this rack, and are heavy, weighing usually from thirty to forty pounds, which requires the handling of the same in two parts, which are hooked together when placed on the hay rack ready for the hay to be placed on the sling.

Another type is the rope sling, which is less expensive and much lighter in weight, weighing usually only five or six pounds, and is easily handled and spread out over the rack, the sling itself being all in one part. As a result, the rope sling has been quite popular, but the rope sling has many defects. The present invention relates to means for improving a rope sling and the apparatus utilized with a rope sling so that the defects in the construction and the manner of releasing the load, when this is desired, are avoided.

One of the principal objects of my invention is to reduce the time and labor involved in unloading a load of hay. With the rope sling as utilized prior to my invention, and in fact, with any type of sling, considerable unnecessary labor and loss of time takes place in making the apparatus ready for hoisting the hay off the rack and into the storage place. The team that has hauled the hay to the storage place on the rack is ordinarily utilized for hoisting the hay. To do the hoisting the team is driven around to the opposite side of the barn to that from which the rack is placed, in order to operate the hoisting apparatus. In all types of rope slings known previously to my invention, it is necessary that two men work together in preparing the load of hay on a sling for hoisting. The rope slings as ordinarily utilized, are made up of three ropes that are supposed to extend parallel to each other across the rack with their ends hanging down off the rack so that these are not covered by the hay in loading the rack. However, the ends very frequently become lost in the hay and considerable difficulty is experienced in getting the ends of the ropes out of the hay so that these can be coupled to the hoisting apparatus, which is to be utilized for hauling the hay into the barn.

Furthermore it is necessary for one man to be on the load of hay to be in a position that he can secure the sling to the hoisting apparatus, which involves means for tripping the same so as to release the load when this is desired. The ends of the ropes, or other flexible members, being in an out of the way position where the man on top of the load of hay cannot reach them, it is necessary that the man who has driven his team of horses around to the other side of the barn for the purpose of hoisting the load of hay, assist the man who is on the load of hay to connect up the sling with the hoisting apparatus, as he must hand the ropes, or other end portions of the sling that are hanging down from the rack, to the man on top of the load of hay on the rack. Accordingly he must either come back after driving his team around to the other side of the barn to help this man connect up the sling with the hoisting apparatus, or else leave his team and help with this connection to the hoisting apparatus before going around to the other side of the barn. In either case, much time is lost and much inefficiency results; for, if the connection of the sling to the hoisting apparatus can be made a one-man job, the man driving the team can go around to the other side of the barn and connect up his team with the hoisting apparatus while the man who is on the load of hay is connecting up the sling with his end of the hoisting apparatus.

One of the principal purposes of my invention is to make it possible for the man on the load of hay to connect up the sling with the hoisting apparatus without any difficulty whatsoever, and without the need of any other person to assist him in doing this. In fact, when the second load of hay is hoisted, it being always customary to place two loads of hay in a hay rack, one above the other, using two slings, it is necessary for the person driving the team to leave his team around on the other side of the barn and come back all the way to the rack and assist the man on the load of hay in getting his hoisting apparatus connected with the sling that supports the lower load of hay, with the apparatus that was in use prior to my invention, and then return to his team. This, under ordinary circumstances, would make it necessary to walk at least three hundred feet, which is absolutely unnecessary with my apparatus in order to get the second load of hay ready for hoisting.

There is not only the advantage in my invention of making it unnecessary to do all this extra walking with a corresponding loss of time, but much trying and unpleasant work is avoided, particularly when the ends of the ropes become lost in the hay, which necessitates hunting for them in the hay and which is a very unpleasant piece of work on a hot day, particularly when alfalfa is being handled, as the leaves get into the man's shirt sleeves who is hunting for the ends of the ropes, causing much annoyance. Not only is at least two and one-half minutes saved on each of the first loads of hay on a rack, with my improved apparatus, and three and one-half minutes saved on each second load, or lower load, but all the annoyance of hunting for lost ends of slings in the hay is avoided.

Another advantage of my invention, which is of particular importance, is that the hay rack is cleaned better. In the rope slings in use prior to my invention, particularly in handling prairie and other dry, brittle hay, such as dry, brittle alfalfa, the apparatus utilized in conjunction with such a sling, which is commonly known as the "one point trip" causes the sling ropes at the sides of the load to be pulled toward the center at both ends of the load, the sling usually comprising a center rope and two side ropes, said side ropes approaching the center rope at the ends of the sling in the course of hoisting the load, causing the support of the ends of the load to be narrowed down to that portion over and near the center rope, leaving the corners of the load entirely unsupported. As a result, after the load has been lifted off the rack, the rack is cleaned in a diamond shaped area, the four corners remaining covered with hay. With my improved apparatus the sling ropes extend straight across the rack in parallel relation with a uniform spread from end to end of the load, avoiding this cutting off of the corners of the load, even though the hay may be quite brittle, and making it possible to lift the load by means of the sling into the barn without losing any of it.

Another advantage of my invention is that the load is carried about eighteen inches higher by the conveying apparatus, due to the manner in which the sling is made. In the usual rope slings, the long sling ropes are drawn together at the top by the so-called "one point trip", causing the load to hang low after being hoisted to its uppermost position and causing the same to drag over barn door sills and other hay in the barn, particularly when it is nearly full, and the hay when dumped, will lie on the sling ropes. The long ropes leave a loose vacant space where the hay is held loosely, causing some of it to slip out of the sling at times. Due to the fact that with my improved type of sling, the ropes can be made much shorter and pulled up much closer to the conveying apparatus for carrying the hay into the barn, the barn can be filled much higher with hay due to the use of my sling, and the load is held much more securely as it is being carried into the barn.

Another advantage that exists is that a much smaller amount of rope is necessary in each sling than where the sling rope ends hang down from the rack to make them available when it is desired to hand the same up to the person on the load of hay for attaching to the hoisting means.

Another advantage present in my invention is that, with my sling and tripping apparatus, no trip rope is left hanging before the barn door that must be removed before driving before the barn with the load of hay. The tripping apparatus in my improved apparatus is detachable from the hoisting and conveying apparatus and has nothing hanging down from the same that is either in the way or has to be tied up to be out of the way, consuming additional time, as was the case with all previously known apparatus of this character.

My improved sling has all the advantages of a rope sling and none of the disadvantages thereof. The various advantages and objects of the invention pointed out above are accomplished due to the fact that my sling is so made that the same can be attached to the hay rack in such a manner that the ends thereof are always available, said means for attaching the same comprising means for holding the ends of the ropes, or other flexible members of the sling, in a uniformly spaced relation from each other so that the ropes, or other flexible members, of the sling will be always parallel to each other from end to end of the sling and cannot be misplaced. The separating means at one end of the sling is, preferably, made a part of the sling, and in order to make the sling easily handled and as convenient as any rope sling, as far as flexibility is concerned, I, preferably, make the separating means for the sling that is used to support the upper load so that the same is collapsible, or foldable, whereby the entire sling can be thrown aside just as though it were made entirely of rope, or other flexible members.

Also it is an important feature of my invention that the tripping apparatus, that is, the apparatus for releasing the load of hay after it has reached the desired point in the barn, is utilized as a means for keeping the ends of the ropes comprising one end of the sling in properly spaced relation to each other and in elevated position on the rack, so that the same are always available, and that the same is detachable from the hoisting apparatus so that it is carried by the rack and not by the hoisting apparatus when not in use for hoisting purposes. Furthermore this tripping means is a reversible three point trip, tripping the load at three points simultaneously, that is, releasing all three ropes from the hoisting apparatus at the same time.

Other objects and advantages of my invention will appear as the description of the drawings proceeds. I desire to have it understood, however, that I do not intend to limit myself to the particular details shown or described, except as defined in the claims.

In the drawings:

Fig. 1 is a view in perspective of a hay rack, showing the lower sling mounted in position to receive a load of hay thereon.

Fig. 2 is a similar view, showing the lower load of hay in position and the sling for supporting the upper load of hay in position ready to receive the upper load of hay.

Fig. 3 is a fragmentary view partly in elevation and partly in section, showing a load of hay in elevated position having reached almost the point at which the release is operated, whereby the hoisting of the load is halted and the movement of the hay into the storage space is begun.

Fig. 4 is a view partly in longitudinal section and partly in elevation of the three-point trip utilized in combination with my apparatus.

Fig. 5 is a fragmentary sectional view on an enlarged scale, taken substantially on the line 5—5 of Fig. 4.

Fig. 6 is a similar view taken substantially on the line 6—6 of Fig. 4.

Fig. 7 is a fragmentary end view of the three-point trip, as viewed from line 7—7, Fig. 4.

Fig. 8 is a fragmentary longitudinal sectional view through the left end thereof.

Fig. 9 is a view in side elevation of the separating member carried by one end of the lower sling.

Fig. 10 is a fragmentary sectional view on a slightly enlarged scale, taken substantially on the line 10—10 of Fig. 9.

Fig. 11 is a fragmentary elevational view of one end of the upper sling utilized in my apparatus, showing the separating means carried by said end of said sling, and Fig. 12 is a fragmentary perspective view, showing the relationship of the holding means on the rack to the tripping member to illustrate the ease with which the sling is connected with the tripping member in my improved apparatus.

Referring in detail to the drawings, my invention is shown as being applied to a hay rack having a bottom 13 and ends 14, which may be made of any desired construction, but which, each preferably, have an upright 15, which extends above the top cross piece of each of said ends. A pin 16 is provided near the upper end of each upright 15 and, at one end of the rack, a pin 17 is provided centrally of the end at a point above the top of the first load of hay when placed on the rack. A central pin 18 and side pins 19 are provided on the other end of the rack at a similar elevation, the same being, preferably, substantially in alignment horizontally. The pins 19 are spaced at a uniform distance from the pin 18 and said three pins are spaced at a distance from each other, which is equal to the spacing of the side ropes of the sling from the center rope of the sling.

My apparatus comprises a lower sling having a central flexible member 20 and side flexible members 21, which are each provided with means for cooperating with the pins 18 and 19, respectively, the same being loops or rings 22, as shown in the drawings. The said loops, or rings, are a permanent part of each flexible member and are engaged with the pins 18 and 19, as shown in Fig. 1. The lower sling further comprises a separating member 23 at the opposite end thereof from the rings, or loops, 22, the flexible members being entirely separate and independent of each other when detached from the hay rack, except at the end thereof provided with the separating member 23. Said separating member 23, which is shown more in detail in Figs. 9 and 10, is, preferably, made of a rod, or heavy wire, and is bent into a triangular form so as to have the diverging legs 24 extending from a central loop 25, by means of which said separating member is secured in elevated position on the end of the rack having the pin 17 thereon by engagement of the loop with said pin.

A cross bar 26 extends transversely between the diverging legs 24, and loops 27 are formed at the junction of said cross bar 26 with the diverging legs 24. Substantially in the middle of said cross bar 26 a coil, or loop, 28 is formed therein, which is in substantial alignment with the loop 25. The central flexible member, or rope, 20 of the sling extends through the loop 28, which acts as a guide member therefor to hold the same in proper central position and the end thereof is secured permanently to the loop 25. The side members 21 are secured to the loops, or eyes, 27, thus providing a uniform spacing for the central flexible member 20 and the side flexible members 21. The spacing of the pins 18 and 19 is such that the side members 21 are spaced from the central member 20 the same distance at the end of the rack carrying these pins as at the end of the rack with which the separating member 23 is mounted. Thus the flexible members 20 and 21 being of proper lengths to reach readily, without undue slack, from the separating member 23 to the pins 18 and 19, the same will be in substantial parallelism throughout their length and will remain so as the hay is being loaded on the sling, due to the fact that the ends of the sling are in substantially a fixed position. Furthermore the ends are elevated and the elevation is such that the separating member 23 and the loop 22 will be readily accessible when the upper load of hay is removed from the rack.

In Fig. 2 the rack is shown filled with hay to the level of the top of the first load with the loop 25 on the pin 17 in readily accessible position, and the ends of the flexible members 21 and 20' having the loops 22 thereon readily accessible above the hay on the pins 18 and 19. The hay is indicated in Fig. 2 by the numeral 30. The upper sling for supporting the upper load of hay on the rack comprises the central flexible member 20' and the side flexible members 21', which are the same in construction as the flexible members previously mentioned. However, instead of utilizing the separating member 23, a different form of separating member is utilized. The reason for this is that in use the lower sling can be replaced in the position shown in Fig. 1 as soon as all the hay has been removed from the rack and left there while the hay is being loaded, whereas the upper sling member must be thrown aside until the first load of hay is in place.

In order to make the same as easy to handle as any of the rope slings now in use when it is desired to throw the same aside temporarily while loading the lower load of hay, the separating member is made collapsible. The mounting of the separating member is shown in detail in Fig. 11. The central flexible member 20' is secured at its end, in the case of the upper sling, to the same ring 22' to which the ends of the side flexible member 21' are secured. The separating member comprises a pair of members 31 and 32, which are loosely connected together by means of the inter-engaging loops 33, being thus loosely hinged to each other. The ends of the members 31 and 32 that are remote from each other are tightly clamped at 34 to the side flexible members 21'. Thus when the parts are in the position shown in Fig. 11 and in Fig. 2 a rigid triangle is formed by means of the flexible members 21' and the bar-like members 31 and 32, the loops 33 being so placed that when the bars 31 and 32 are in alignment there will be only a very slight endwise movement of the one loop relative to the other. However, the loops can be swung on each other to move the bars 31 and 32 into a substantially side by side relation.

The bar 31 is provided with a coil, or loop, 35 therein adjacent the end thereof having the loop 33 therein, through which the flexible member 20' passes, the same being midway between the ends 34 of the collapsible separating member and being thus in alignment with the loop 22' when the parts are in the operative position shown in Fig. 2. When this is the case, the separating member functions in exactly the same manner as the separating member 23, previously described. When in this position the loop 22' is in engagement with the pin 16 provided on the end of the rack that has the pin 17 thereon.

The flexible members 20' and 21' are provided with the loops 22 just as are the members 20 and 21. Said loops are engaged with a combined trip and separating member 37, which is shown more in detail in Figs. 4 to 8, inclusive. Said combined trip and separating member comprises a pair of diverging legs 38, the same being, preferably, made of strap metal and have the angular end portion 40 provided on a central member 41 secured thereto adjacent their junction by means of fastening elements, such as the rivets 39, so that said central member extends downwardly in bisecting relation to the legs 38. The legs 38 terminate in depending ears 44, which serve as bearings for a tubular shaft 45, any suitable means, such as collars 46 being provided for holding the shaft in assembled relation with the ears 44. An opening is also provided at 47 in the member 41 for receiving rotatably the shaft 45. A pair of pins 48 are shown extending through the shaft 45 at the ends thereof outwardly from the ears 44, the same being shown as being used for holding the collars 46 in place, as well as for another purpose, which will appear presently. A similar pin 49 is also extended through the hollow shaft 45 adjacent central member 41. Said pins 48 are longer than the diameter of the collars 46 so as to project upwardly obliquely therefrom when the parts are in the position shown in Fig. 4, and the same is true of the pin 49, which projects through the shaft 45 so as to project upwardly obliquely therefrom a desired distance, and said pins have their extremities bent into a hook-like shape, as indicated at 42. Cooperating with the curved hook ends 42 of the pins 48 and 49 are the guard springs 50 which are carried by the legs 38 at the ears 44, and the member 41 adjacent the opening 47, said guard springs being secured to the members 38 and 41 in any suitable manner, as by rivets 43. A swivel member 51 having a loop 52 thereon is mounted in the member 37 at the junction of the legs 38 and extends through aligning openings in the member 37 and the angular end 40 of the member 41.

It will be evident that, when the parts are in the position shown in Figs. 4 to 8, inclusive, the loops 22 on the ends of the flexible members 20' and 21' may be engaged with the hook ends 42 of the pins 48 and 49 and that while the parts are in such position, the flexible guard members, or springs 50 will prevent accidental disengagement of said loops 22 from the upstanding hook ends of said pins. The pins 48 and 49 are spaced at substantially the same distance from each other as are the pins 18 and 19 and it will be evident that when the parts are in the position shown in Figs. 4 to 8, inclusive, and the loop 52 on the separator member 37 is in engagement with the pin 16 on the end of the rack having the pins 18 and 19 thereon, the flexible members 20' and 21' will be spaced so that the same will lie in a position of substantial parallelism across the lower load of hay and up the ends of the rack with their ends in elevated position so that the loop 22' on one end of the upper sling and the loop 52 at the other end thereof can be readily reached so that the same can be engaged with the hoisting apparatus when this is desired. It will also be evident upon reference to Fig. 12 that due to the fact that the spacing of the pins 48 and 49 is substantially the same as the pins 18 and 19, the flexible members 20 and 21 can be readily engaged with the pins 48 and 49 without difficulty, when this is found to be necessary in preparing the lower load of hay for removal from the rack, as will be explained in detail below.

After the hay rack has been loaded with two sling-loads of hay, the hay rack is transported to the barn and the two sling-loads of hay are hoisted and transported one after the other into the barn. For this purpose a track 55 is usually provided, upon which a carrier 56 runs on suitable wheels 57. A pulley 58 is mounted on a depending bracket 59 on the carrier and a rope 60 operates over this pulley and over a pulley 53 on said bracket and extends to an eye 61 to which the end of the rope 60 is fastened. To permit hoisting, the carrier is held in stationary position on the track by any suitable releasable holding means and is held in locking position by means of a spring 64, said means being released by a tripping member 65 when moved to act against the compression of the spring 64 to move the holding means out of holding position. This takes place when the rope 60, or the load of hay itself, engages the member 65.

The rope 60 also has a pair of pulleys 66 and 67 thereon, which are provided with hooks 68 and 69. The hook 69 is engaged with the eye 25 on the separating member 23, or the eye 22' on the sling having the collapsible separator member thereon. In either case the separator member is detached from the rack end and is engaged with the hook 69, the rope 60 at that time being extended downwardly from the carrier 56 so that the two pulleys 66 and 67 can be widely separated. The pulley 66 having the hook 68 thereon is pulled over toward the other end of the rack and is engaged with the loop 52 on the upper end of the member 37, and after this has been done the rope 60 is pulled by the team of horses, or any other suitable means, drawing the pulleys 66 and 67 upwardly and toward each other until the same approach almost into engagement, with the load of hay 30 held tightly within the sling. When the pulleys reach such a position that the load of hay or the rope 60 engages the releasing member 65 movement of the load of hay along the track due to continued pull on the rope 60 begins.

In operation the upper sling is, of course, first engaged with this hoisting apparatus by engaging the loop 22' and the loop 52 with the hooks 69 and 68, respectively. After this load has been disposed of and the combined separating and tripping member 37 is again ready for use with another load, it is brought into the position shown in Fig. 12 and engaged with the rings, or loops, 22 at the end of the flexible members 20 and 21, whereupon the lower load of hay, which is the one shown in Fig. 3, is engaged with the hoisting apparatus by engaging the loop 25 and the loop 52 with the hooks 69 and 68 in the same manner as previously described, this load being drawn up, as previously described, and moving along the track upon engagement of the load, or the rope 60, with the releasing member 65.

Means for tripping the combined separating and tripping member, or three-point trip 37, is provided, which comprises holding means for holding the member 45 from rotating and means for releasing said holding means. The holding means comprises a collar 70 secured to the hollow shaft 45 by means of a pin 71, said collar having an ear 72 projecting therefrom, which is provided with a slot 73 therein, and which has a beveled face 74 on one of the bifurcations 54 on the ear formed by means of said slot 73.

A latch lever 75 in the form of a bell crank, is provided, which has the latching portion 76 thereof in engagement with the slot 73, said latching portion having the opposed faces thereof extending at an acute angle to each other and having a beveled portion 63 on one side of the same adjacent its apex, the same being pivoted at 77 on a bracket provided on the member 41, said bracket comprising, preferably, merely a pair of ears 78 provided on the member 41. The member 41 is also provided with a large slot 79, into which the entire latching end portion 76 of the lever is adapted to swing. The arm 80 of said lever has one end of the spring 81 engaging the same, the other end of said spring being secured at 82 to one of the legs 38 of the member 37, said spring acting to hold the locking member 76 normally in the slot 73. A lug 83 is provided on the lever 75, for attachment of said spring, spaced from the end of said lever having an eye 85 formed thereon for fastening the trip rope 84 thereto, said rope being of any desired length and being of such length that the same will extend into the hay rack, even when the load of hay traveling along by means of the carrier 56 is at the most remote point in the barn from the hay rack. The arm 80 of said lever is offset at 62 to permit the same to swing past the member 41, and is so shaped as to permit swinging of the same to the two dotted positions shown in Fig. 4, without engagement of any part thereof with the member 41.

In operation the trip rope is pulled when the load of hay reaches the desired location in the barn, or other storage place, whereupon the latch 76 is swung out of the slot 73 to either of the dotted line positions shown in Fig. 4 and the weight of the load thereupon rotates the shaft 45 in its bearings, causing the curved hook ends of the pins to move out of cooperative relation with the guard springs 50, whereupon the three rings 22 are released from the pins 48 and 49, respectively, and the load is dumped, such release occurring simultaneously, or substantially simultaneously. As soon as it is desired to lock the holding means back in locking position, all that is necessary is to rotate the shaft 45 on its bearings in a counter-clockwise direction, as viewed in Fig. 5, until the inclined shoulder 74 engages with the beveled portion 63 on the under side of the latch portion 76, whereupon the latch will be raised until it passes over said inclined face and into the slot 73, the spring 81 normally tending to hold the locking lever in the full line position shown in Fig. 4. The member 37 can be carried on the rack on its pin 16 when the rack is again taken away for loading, and the same is true of the entire lower sling, which can be put in the position shown in Fig. 1. The upper sling, however, has to be thrown aside while the first load of hay is being placed in position and can be very compactly folded up for this purpose, if this is desired.

An important feature of the three point trip device 37 is that the same will operate with the trip rope 84 extending in either direction therefrom. This is desirable due to the fact that the position of the member 37 has to be reversed when used with the lower load of hay from that which it has when used with the upper load of hay. Thus when the member 37 is mounted on the rack as shown in Fig. 2 the pins 48 and 49 project forwardly toward the load of hay and the opposite end of the rack and upwardly at an oblique angle. When this is the case, assuming the track 55 in Fig. 3 runs away from the person viewing the drawing, the locking member 70 will be on the side of the member 37 which will be rearward as the load moves along the track. The trip rope will then extend on the same side of the member 41 as the member 70 and the trip will be operated by a pull of said rope to the left in Fig. 4, moving the latch 76 downwardly in the slot 73 until the upper beveled face thereof is flush with the member 41 and said latch lies within the slot 79. However, when the lower load of hay is to be engaged with the hoisting apparatus, the member 37 is placed in the position shown in Fig. 12 with the pins 48 and 49 thereon projecting upwardly and toward the opposite end of the rack at an oblique angle so that the loops can be slipped over the upstanding hook ends of said pins. When the member 37 is engaged with its hook 68 it will, however, be in such position as to be reversed, with the locking member 70 on the side of the member 37, which will be forward as the load moves along the track 55, shown in Fig. 3. The trip rope will then extend on the opposite side of the member 41 from the member 70, and the trip will be operated by a pull on the rope to the right in Fig. 4, moving the latch 76 upwardly in the slot 73 until the lower beveled face thereof is flush with the member 41 and said latch lies in the slot 79.

I claim:—

1. The combination with a hay rack, of a sling comprising a central flexible member and side flexible members, said flexible members extending lengthwise of said rack, and cooperating means on said rack and sling for securing both ends of said sling on said rack in an elevated position, said means holding said side flexible members in a predetermined spaced non-converging relation from the central flexible member adjacent the ends thereof, to form a basket-like hay support having upwardly extending wide end portions supported on said rack.

2. The combination with a hay rack, of a sling comprising a central flexible member and side flexible members, said flexible members extending lengthwise of said rack, and cooperating means on said rack and sling for securing both ends of said sling on said rack in an elevated position, said means comprising an elongated separating member holding said side flexible members in a predetermined spaced relation from the central flexible member adjacent the ends thereof, and being provided with means adjacent the ends of and between the ends of said separating member for detachably receiving said flexible members.

3. The combination with a hay rack, of a sling comprising a central flexible member and side flexible members, said flexible members extending lengthwise of said rack, and means for securing both ends of said sling on said rack in an elevated position and holding said side flexible members in the same predetermined spaced relation from the central flexible member adjacent both ends of said sling, said means comprising a central pin on an end of said rack and pins on said end spaced a predetermined distance to each side of said central pin and an elongated spacing member at the other end of said rack.

4. The combination with a hay rack, of a sling comprising a central flexible member and side flexible members, said flexible members extending lengthwise of said rack, and means for securing both ends of said sling on said rack in an elevated position and holding said side flexible members in a predetermined spaced relation from the central flexible member adjacent the ends thereof, said means comprising an elongated separating member at each end of said sling, one of said separating members having means adjacent the ends thereof for detachably receiving said side flexible members and means between the ends of said separating member for detachably receiving said central flexible member, and cooperating means on said separating members and said rack for detachably supporting said separating members on said rack in an elevated position.

5. The combination with a hay rack, of a sling comprising a central flexible member and side flexible members, said flexible members extending lengthwise of said rack, and means for securing both ends of said sling on said rack in an elevated position and holding said side flexible members in a predetermined spaced relation from the central flexible member adjacent the ends thereof, said means comprising a separating member, said separating member being provided with means adjacent the ends thereof and between the ends thereof for detachably receiving said flexible members.

6. The combination with a hay rack, of a sling comprising a central flexible member and side flexible members, said flexible members extending lengthwise of said rack, and means for securing both ends of said sling on said rack in an elevated position and holding said side flexible members in a predetermined spaced relation from the central flexible member adjacent the ends thereof, said means comprising an elongated separating member detachably mounted on said rack in an elevated position and provided with means adjacent the ends of and between the ends of said separating member for detachably receiving said flexible members, said separating member comprising tripping means for simultaneously releasing all said flexible members from said separating member.

7. The combination with a hay rack, of a sling comprising a plurality of flexible members extending lengthwise of said rack and means for securing both ends of said sling in a fixed elevated position on said rack, said means comprising a separating member elongated transversely of said sling and carried by said sling to widely space said flexible members adjacent one end thereof, said separating member detachably engaging said rack and means on each of said flexible members at the other end thereof engaging widely transversely spaced cooperating means on said rack to space said flexible members at the other end thereof substantially the same distance from each other as at said one end.

8. The combination with a hay rack, of a sling comprising a plurality of flexible members extending lengthwise of said rack and means for securing both ends of said sling in a fixed elevated position on said rack, said means comprising a separating member elongated transversely of said sling and carried by said sling to space widely said flexible members transversely of said sling adjacent one end thereof, said separating member detachably engaging said rack and means on each of said flexible members at the other end thereof engaging spaced cooperating means on said rack to space said flexible members at the other end thereof substantially the same distance from each other as at said one end, said means on said rack comprising a plurality of pins spaced transversely of said rack between the top and bottom thereof.

9. The combination with a hay rack, of a sling comprising a plurality of flexible members extending lengthwise of said rack and means for securing both ends of said sling in a fixed elevated position on said rack in widely transversely spaced relation, said means comprising a separating member carried by said sling and elongated transversely of said sling to space said flexible members adjacent one end thereof, said separating member detachably engaging said rack and means on each of said flexible members at the other end thereof engaging spaced cooperating means on said rack to space said flexible members at the other end thereof, said means on said rack comprising a hanger member elongated transversely of said sling detachably engaging said rack and having tripping means thereon for simultaneously releasing all said flexible members from said hanger member.

10. A hay sling of the character described, comprising a central flexible member and side flexible members, a member spacing said side members from said central member adjacent the one end of said central member, said side flexible members being entirely free of said central flexible member and from each other from the other end of said central flexible member to said spacing member, said spacing member comprising a triangular frame elongated transversely of said sling and having said central flexible member bisecting the length thereof and secured to one apex thereof and the side flexible members secured to the apexes thereof at opposite ends of the long side thereof.

11. A hay sling of the character described, comprising a central flexible member and side flexible members, a member spacing said side members from said central member adjacent the one end of said central member, said side flexible members being entirely free of said central flexible member and from each other from the other end of said central flexible member to said spacing member, said spacing member comprising a triangular frame elongated transversely of said sling and having a central flexible member bisecting the length thereof and secured to one apex thereof and the side flexible members secured to the apexes thereof at opposite ends of the long side thereof, said long side having guiding means for said central flexible member intermediate said last mentioned apexes.

12. A hay sling of the character described, comprising a central flexible member and side flexible members, a member spacing said side members from said central member adjacent the one end of said central member, said side flexible members being entirely free of said central flexible member and from each other from the other end of said central flexible member to said spacing member, said spacing member comprising a pair of bars movably connected together and having means for receiving said side flexible members at the remote ends thereof and one thereof having means for receiving said central flexible member adjacent the connection between the same.

13. The combination with a hay rack, of a sling comprising a central flexible member and side flexible members, said flexible members extending lengthwise of said rack, and means for securing both ends of said sling detachably on said rack in an elevated position and holding said side flexible members in a predetermined spaced relation from the central flexible member adjacent the ends thereof, said means comprising a separating member elongated transversely of said sling and provided with means adjacent the ends of and between the ends thereof for detachably receiving said flexible members, said separating member comprising a hanger member detachably mounted on said rack and having diverging legs, a shaft rotatably mounted therein, spaced pins projecting therefrom, guard members fixed on said hanger member, means for holding said shaft against rotation with said guard members in cooperative relation to said pins, means on said flexible members engaging said pins and means for releasing said holding means to permit said shaft to rotate to move said pins away from said guard means to simultaneously release said flexible members from said separating member.

14. In a device of the character described, a frame member, a member mounted for rotation therein having a plurality of pins projecting therefrom, guard means adapted to cooperate with said pins and means for holding said rotatable member in a position such that said pins are in cooperative relation with said guard means, comprising a locking member fixed on said rotatable member, a latch mounted on said frame member, means for normally holding said latch in locking engagement with said locking member and means for moving said latch out of engagement with said locking member, said latch being movable in either of two opposed directions from locking to unlocking position.

15. In a device of the character described, a frame member, a member mounted for rotation therein having a plurality of pins projecting therefrom, resilient guard means adapted to cooperate with said pins and means for holding said rotatable member in a position such that said pins are in cooperative relation with said guard means, comprising a locking member fixed on said rotatable member, a latch mounted on said frame member, means for normally holding said latch in locking engagement with said locking member and means for moving said latch out of engagement with said locking member, said latch being movable in either of two opposed directions from locking to unlocking position.

16. In a device of the character described, a frame member, a member mounted for rotation therein having a plurality of pins having hook-like curved ends projecting therefrom, a resilient guard member adapted to cooperate with each of said pins and means for holding said rotatable member in a position such that said pins are in cooperative relation with said guard means, comprising a locking member fixed on said rotatable member, a latch mounted on said frame member, means for normally holding said latch in locking engagement with said locking member and means for moving said latch out of engagement with said locking member, said latch being movable in either of two opposed directions from locking to unlocking position.

17. In a device of the character described, a frame member, a member mounted for rotation therein having a plurality of pins projecting therefrom, guard means adapted to cooperate with said pins and means for holding said rotatable member in a position such that said pins are in cooperative relation with said guard means, comprising a locking member fixed on said rotatable member, a latch pivotally mounted on said frame member to swing into and out of locking engagement with said locking member, resilient means for holding said latch member in an intermediate locking position, and means for swinging said latch member in either direction from said locking position against the action of said resilient means to disengage the same from said locking means.

18. In a device of the character described, a frame member, a member mounted for rotation therein having a plurality of pins projecting therefrom, guard means adapted to cooperate with said pins and means for holding said rotatable member in a position such that said pins are in cooperative relation with said guard means, comprising a locking member fixed on said rotatable member, a latch pivotally mounted on said frame member to swing into and out of locking engagement with said locking member, resilient means for holding said latch member in an intermediate locking position, and means for swinging said latch member in either direction from said locking position against the action of said resilient means to disengage the same from said locking means, said latch and locking member having cam faces engageable to move said latch into locking engagement with said locking member upon rotation of said rotatable member in a predetermined direction.

19. The combination with a hay rack, of a sling comprising a plurality of flexible members extending lengthwise of said rack and means for securing both ends of said sling in a fixed elevated position on said rack, said means comprising a separating member carried by said sling and spacing said flexible members adjacent one end thereof, said separating member detachably engaging said rack and means on each of said flexible members at the other end thereof engaging spaced cooperating means on said rack to space said flexible members at the other end thereof, said means on said rack comprising a hanger member having tripping means thereon for simultaneously releasing all said flexible members from said hanger member, and having a swiveled member thereon for securing the same to a support.

20. In a device of the character described, a frame member, a member mounted for rotation therein having a plurality of projecting members extending therefrom, guard means adapted to cooperate with said projecting members and means for holding said rotatable member in a position such that said projecting members are in cooperative relation with said guard means, comprising a locking member fixed on said rotatable member, a latch mounted on said frame member, means for normally holding said latch in locking engagement with said locking member, means for moving said latch out of engagement with said locking member, said latch being movable in either of two opposed directions from locking to unlocking position, and a swivel for securing said frame to a support.

21. In a device of the character described, a frame member, a member mounted for rotation therein having a plurality of projecting members extending therefrom, guard means adapted to cooperate with said projecting members and means for holding said rotatable member in a position such that said projecting members are in cooperative relation with said guard means, comprising a locking member fixed on said rotatable member, a latch mounted on said frame member, means for normally holding said latch in locking engagement with said locking member, means for moving said latch out of engagement with said locking member, said latch being movable in either of two opposed directions from locking to unlocking position, and means for mounting said frame on a supporting member to permit the reversal of the position of said hanger relative to said supporting member.

JOHN T. MARTIN.